(12) United States Patent
Hageman et al.

(10) Patent No.: US 7,481,054 B2
(45) Date of Patent: Jan. 27, 2009

(54) SHAPE MEMORY ALLOY ACTUATOR

(75) Inventors: John B. Hageman, Vandalia, OH (US); Bryan P. Riddiford, Centerville, OH (US); Thomas D. Hewer, Dayton, OH (US)

(73) Assignee: Delphi Technologies, Inc., Troy, MI (US)

( * ) Notice: Subject to any disclaimer, the term of this patent is extended or adjusted under 35 U.S.C. 154(b) by 559 days.

(21) Appl. No.: 11/140,079

(22) Filed: May 26, 2005

(65) Prior Publication Data

US 2005/0274580 A1    Dec. 15, 2005

Related U.S. Application Data

(60) Provisional application No. 60/579,390, filed on Jun. 14, 2004.

(51) Int. Cl.
*F01B 29/10* (2006.01)
(52) U.S. Cl. .......................................... 60/527; 60/528
(58) Field of Classification Search ........... 60/527–529; 310/307–309
See application file for complete search history.

(56) References Cited

U.S. PATENT DOCUMENTS

| 4,938,320 | A | 7/1990 | Hyde et al. | |
|---|---|---|---|---|
| 5,821,664 | A * | 10/1998 | Shahinpoor | 310/307 |
| 6,374,608 | B1 * | 4/2002 | Corris et al. | 60/528 |
| 6,508,339 | B2 | 1/2003 | Asai et al. | |
| 6,691,838 | B2 | 2/2004 | Wang | |
| 6,877,589 | B2 | 4/2005 | Ikeda | |
| 6,928,812 | B2 * | 8/2005 | Donakowski et al. | 60/527 |
| 6,972,659 | B2 * | 12/2005 | von Behrens et al. | 337/139 |
| 7,117,673 | B2 * | 10/2006 | Szilagyi | 60/528 |
| 2004/0055835 | A1 * | 3/2004 | Klode et al. | 188/156 |
| 2005/0023086 | A1 | 2/2005 | Szilagyi | |

* cited by examiner

*Primary Examiner*—Hoang M Nguyen
(74) *Attorney, Agent, or Firm*—Thomas N. Twomey

(57) ABSTRACT

A shape memory alloy actuator includes a housing, a plunger, a shaft, a resilient member, and a shape memory alloy component. The plunger is slidably but non-rotatably received in the housing and has a first locking component. The shaft has a second locking component. The resilient member is positioned to slidably urge the plunger into a disengagement position of the first and second locking components allowing rotation of the shaft. The shape memory alloy component is positioned to slidably urge the plunger into an engagement position of the first and second locking components, when the shape memory alloy component is heated, preventing rotation of the shaft. In one application, the first and second locking components are interdigitable vehicle-parking-brake latch teeth.

18 Claims, 4 Drawing Sheets

SHAPE MEMORY ALLOY ACTUATOR

CROSS REFERENCE TO RELATED APPLICATIONS

The present application claims priority of U.S. Provisional Application No. 60/579,390 filed Jun. 14, 2004.

TECHNICAL FIELD

This invention relates to actuators and, more particularly, to actuators having a shape memory alloy into which a predetermined shape has been impressed in the martensite state.

BACKGROUND OF THE INVENTION

It is known in the art to utilize electro-mechanical actuators to select between two or more states of a device or system. For example, it is common to engage a brake with an electromagnetic solenoid to stop and hold a motor shaft from turning. To engage the brake, the solenoid is electrically energized, causing a plunger of the solenoid to actuate and move a latching mechanism from a disengaged position to an engaged position such that the latching mechanism engages a face gear on the motor shaft. The solenoid is then de-energized. The brake is held in the engaged position until disengaged by any conventional means, such as energizing the motor.

Electro-magnetic solenoids suffer from a number of drawbacks. For example, the actuation characteristics of a solenoid depend upon, among other things, the properties of the electromagnet. In turn, the properties of the electromagnet are dependent on such variables as wire size, the number of turns of wire, plunger material properties, and air gaps in the solenoid assembly. At least some of these variables are difficult to control. As a result, solenoids must be built to exacting specifications, making them expensive and time-consuming to manufacture.

Another limitation of electromagnetic solenoids is that their shape is necessarily bulky owing to the volume required for the electromagnet, which typically has a central opening to slidably accommodate a plunger. The relative bulk of a typical solenoid limits its use where size is a constraint.

There is a need for an electro-mechanical actuator that can be manufactured easily and inexpensively. There is an additional need for an electro-mechanical actuator having a smaller package size than current electromagnetic solenoids.

SUMMARY OF THE INVENTION

A first expression of an embodiment of the invention is for a shape memory alloy actuator which includes a housing, a plunger, a shaft, a resilient member, and a shape memory alloy component. The plunger is slidably but non-rotatably received in the housing and has a first locking component. The shaft has a second locking component. The resilient member is positioned to slidably urge the plunger into a disengagement position of the first and second locking components allowing rotation of the shaft. The shape memory alloy component is positioned to slidably urge the plunger into an engagement position of the first and second locking components, when the shape memory alloy component is heated, preventing rotation of the shaft.

A second expression of an embodiment of the invention is for a shape memory alloy actuator which includes a housing, a plunger, a shaft, a resilient member, and a shape memory alloy component. The plunger is slidably but non-rotatably received in the housing and has a central opening with circumferentially spaced apart and radially-inwardly projecting teeth. The shaft has circumferentially spaced apart and longitudinally projecting teeth. The resilient member is positioned to slidably urge the plunger into a disengagement position with the teeth of the plunger longitudinally spaced apart from the teeth of the shaft allowing rotation of the shaft. The shape memory alloy component is positioned to slidably urge the plunger into an engagement position with the teeth of the plunger longitudinally interdigitated with the teeth of the shaft, when the shape memory alloy component is heated, preventing rotation of the shaft.

A third expression of an embodiment of the invention is for a shape memory alloy actuator which includes a vehicle-parking-brake latch housing, a plunger, a shaft, a resilient member, and a shape memory alloy component. The plunger is slidably but non-rotatably received in the housing and has a central opening with circumferentially spaced apart and radially-inwardly projecting vehicle-parking-brake latch teeth. The shaft has circumferentially spaced apart and longitudinally projecting vehicle-parking-brake latch teeth. The resilient member is positioned to slidably urge the plunger into a disengagement position with the teeth of the plunger longitudinally spaced apart from the teeth of the shaft allowing rotation of the shaft. The shape memory alloy component is positioned to slidably urge the plunger into an engagement position with the teeth of the plunger longitudinally interdigitated with the teeth of the shaft, when the shape memory alloy component is heated, preventing rotation of the shaft.

SUMMARY OF THE DRAWINGS

Further features of an embodiment of the present invention will become apparent to those skilled in the art from reading the following specification with reference to the accompanying drawings, in which.

DETAILED DESCRIPTION

Figure 1:
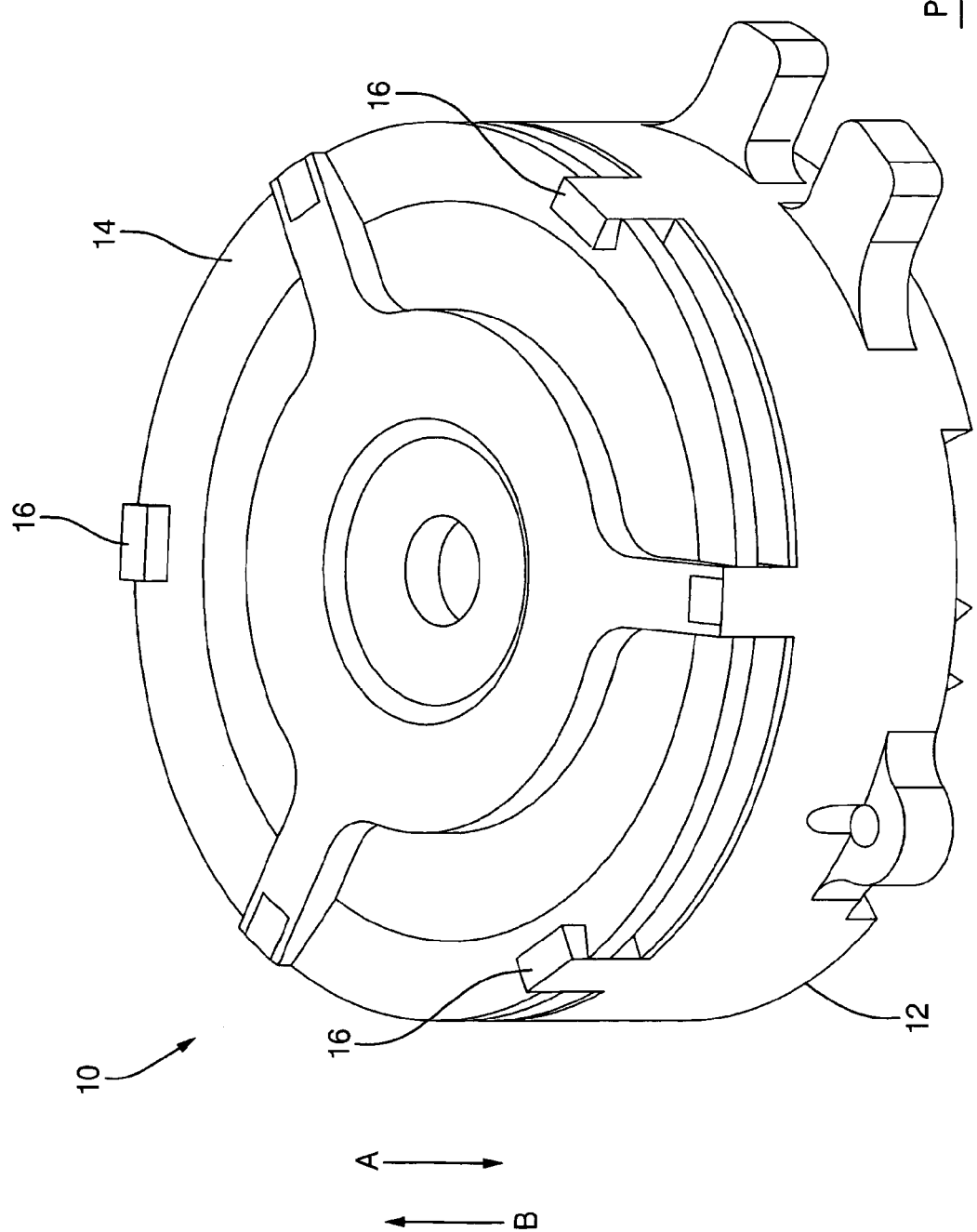
FIG. 1 is a perspective view of a prior art solenoid.

A typical prior art solenoid actuator 10 is shown in FIG. 1. Solenoid 10 includes a housing 12 having an electromagnet (not shown) and a resilient member, such as a spring (not shown). A magnetically permeable plunger 14 is slidably disposed on a plurality of guides 16. Plunger 14 is held away from housing 12 by the spring when the electromagnet is de-energized, but is restrained from separating from the housing by a stop (not shown). When the electromagnet is energized, magnetic flux from the electromagnet attracts plunger 14 in direction "A," in opposition to the spring. When the electromagnet is de-energized, the magnetic field surrounding the electromagnet collapses and plunger 14 is forced in direction "B" by the spring, away from housing 12. Plunger 14 may be operatively engaged to an external member, for example a latch (not shown), such that the latch is moved between at least two predetermined positions by energizing and de-energizing the electromagnet.

As can be seen by one skilled in the art, the geometry of solenoid 10 is necessarily bulky due to the size and shape of the electromagnet required to move plunger 14. Further, the opposing force of the resilient member and the specifications of the electromagnet must be carefully selected so that plunger 14 moves reliably in directions A and B under varying conditions such as voltage supply and temperature. The range of allowable variability of these components is small, thus driving a need for components made to small tolerances.

Figure 2:
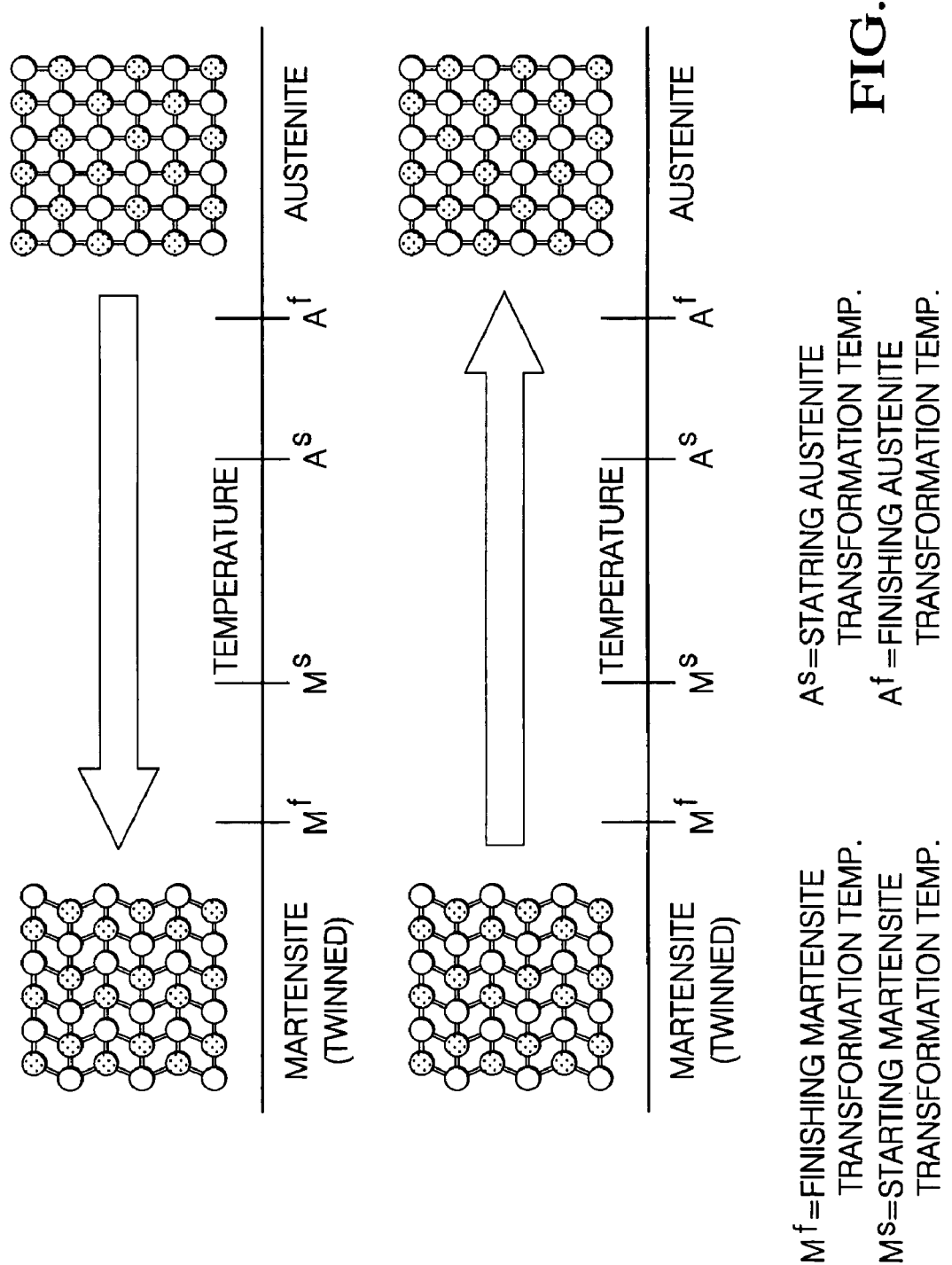
FIG. 2 is a graph showing the phase transition of a shape memory alloy device.
Figure 3:
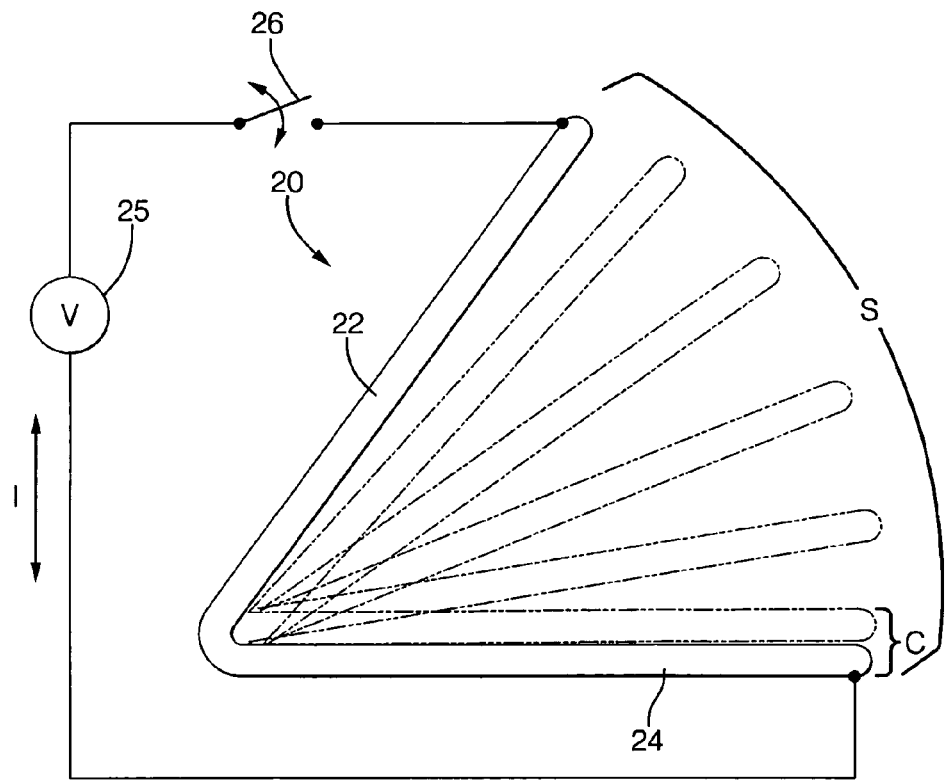
FIG. 3 illustrates the characteristics of a shape memory alloy device when energized and de-energized.

With reference to FIGS. 2 and 3, according to an embodiment of the present invention at least one SMA device 20 may be used in an actuator, eliminating the need for an electromagnet to move a plunger selectively between at least two predetermined positions. SMA devices 20 are made from a conventional shape memory alloy material. As illustrated in FIG. 2, as shape memory alloy materials are heated, the material undergoes a phase transition from martensite to austenite. If there is no prestress on the part, there is little contraction as the heating occurs. However, if the part is deformed or memory strained in the martensite state, it will revert to the original geometry when heated to the austinite transformation temperature. Heating the memory material with electrical current is usually the most convenient method to initiate the phase transition. If the initial memory strain is properly imposed into the shape memory material and SMA device 20 is properly constrained in use, the device will revert back to the strained geometry when cooled back to the martensite structure. This usable memory strain can be up to about 4-5% for extended cyclic use. Shape memory material is available from various sources including, but not limited to, products sold under the trademark FLEXINOL. Example characteristics of shape memory alloy are shown in Table 1.

TABLE 1

| Wire Diameter Size, in. | Resistance, Ω/in. | Maximum Pull Force (grams) | Maximum Pull Force (lbs) | Approximate Current at Room Temp., A | Contraction Time, Sec. | Off Time 90° C. Wire |
| --- | --- | --- | --- | --- | --- | --- |
| 0.010 | 0.5 | 930 | 2.05 | 1.00 | 1 | 3.5 |
| 0.012 | 0.33 | 1250 | 2.76 | 1.75 | 1 | 6 |
| 0.015 | 0.2 | 2000 | 4.41 | 2.75 | 1 | 10 |

An example SMA device 20 is shown in FIG. 3. According to an embodiment of the present invention, SMA device 20 is clamshell-shaped and formed from a single piece of material, having a first leg 22 and a second leg 24. However, one skilled in the art will appreciate that many shapes and constructions of SMA device 20 are possible without departing from the scope of the invention. A voltage "V" is generated by a power supply 25 and applied across SMA device 20 when a switch 26 is closed, causing a current "I" to flow through the device. Voltage V and current I may be DC and/or AC. As current I flows through SMA device 20 it becomes heated, causing legs 22, 24 to move away from a closed position "C" to a separated position "S." When switch 26 is opened, current stops flowing through SMA device 20 and it begins to cool. As SMA device 20 cools, legs 22, 24 return to their original closed position "C."

Figure 4:
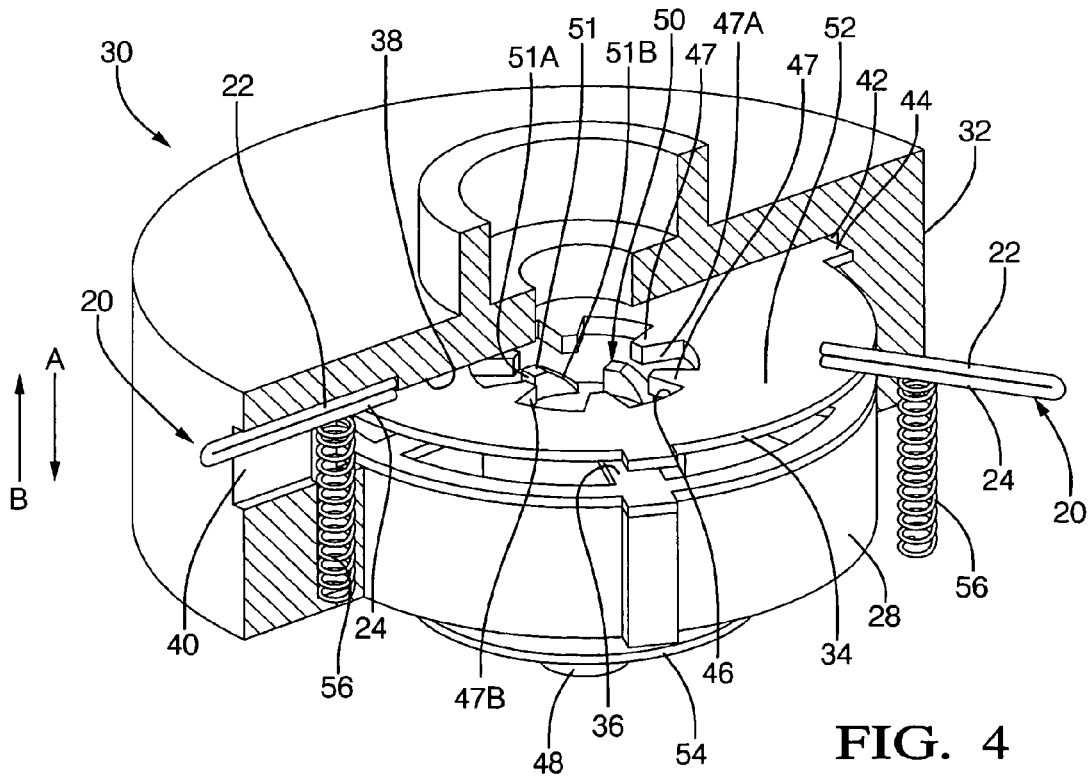
FIG. 4 is a view in section of an actuator in a disengaged state according to an embodiment of the present invention.

An actuator 30 according to an embodiment of the present invention is shown FIG. 4. Actuator 30 includes a housing 32, a plunger 34, a resilient member 36 and at least one SMA device 20.

Housing 32 may be any shape appropriate for a particular use while generally enclosing the components of actuator 30. Housing 32 may be made of any conventional material, such as plastic, metal and composites. Housing 32 includes an upper interior surface 38, and further includes a plurality of channels 40 to receive SMA devices 20 and slots 42 to receive tabs 44 of plunger 34 (discussed below).

Plunger 34 is generally disc-shaped in this embodiment, though other shapes such as, without limitation, rectangular, oval and polygonal shapes may be preferable for particular applications. Plunger 34 includes a plurality of tabs 44 and engagement means, such as a keyed opening 46. Opening 46 may be shaped to include teeth 47 having inclined faces 47A that engage a device such as, for example, a motor shaft 48 having an attached face gear 50 with teeth 51 having inclined faces 51A and backs 51B. Plunger 34 is disposed within housing 32 proximate interior surface 38, and is slidable in directions "A" and "B" but is not rotatable by means of the engagement of elongate slots 42 and tabs 44. In addition to preventing rotation of plunger 34 relative to housing 32, slots 42 act as guides to control the limits of movement of the plunger within the housing.

A clearance is maintained between opening 46 and face gear 50 by a resilient member 36, thereby allowing relative rotation of motor shaft 48. Resilient member 36 may be, without limitation, a reed spring, a helical spring or a compressible material. Resilient member 36 may be any shape appropriate for housing 32 and effective to selectively separate plunger 34 and face gear 50. Resilient member 36 may be disposed proximate a spacer 28 to position the resilient member relative to plunger 34 and gear face 50. In alternate embodiments spacer 28 and resilient member 36 may be a single piece made of resilient material, or the resilient member may be permanently attached to the spacer by any conventional means such as, for example, adhesives, molding and welding.

At least one SMA device 20 is located at each channel 40 such that one of legs 22, 24 are in contact with upper interior surface 38 of housing 32 and the other leg is in contact with an upper surface 52 of plunger 34. SMA devices 20 are each coupled to an electrical power supply 25 in any conventional manner, such as illustrated in FIG. 3. Electrical power may be provided in any conventional manner including, without limitation, mechanical and electronic switches, voltage-controlled supplies, current-controlled supplies, and feedback systems monitoring metrics such as SMA device 20 temperature, voltage and current, and the position of plunger 34.

Actuator 30 of FIG. 4 is shown in a disengaged state. In this state, SMA devices 20 are de-energized, causing legs 44, 46 to be positioned generally parallel to each other (see FIG. 3) when not heated. Plunger 34 is held apart from face gear 50 by resilient member 36, proximate upper interior surface 38 of housing 32, allowing motor shaft 48 to rotate freely.

Figure 5:
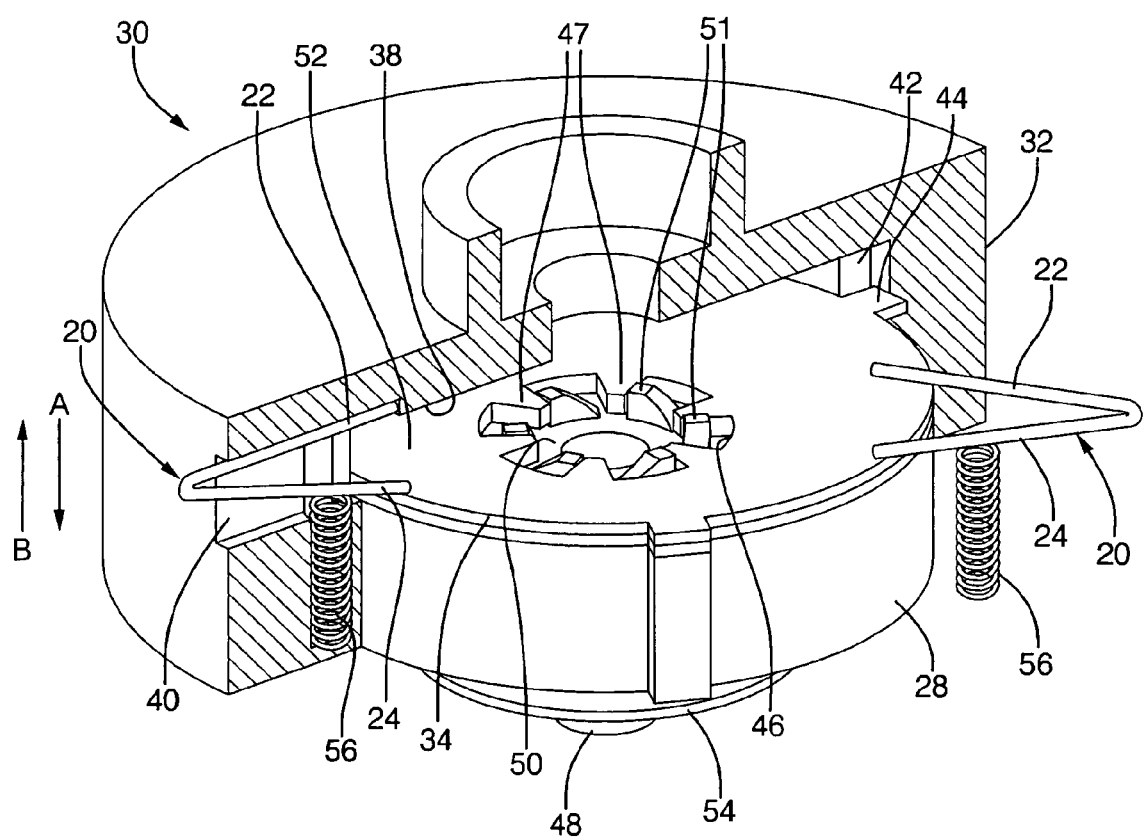
FIG. 5 is a view of the actuator of FIG. 4 in an engaged state.

FIG. 5 shows actuator 30 in an engaged state. Electrical current is applied to SMA devices 20 from power supply 25 (see FIG. 3), causing them to become heated. As the martensite-to-austenite phase transition occurs (see FIG. 2), the wire form of actuators 20 contracts, causing legs 22, 24 to separate (see FIG. 3) such that the legs exert sufficient force to push plunger 34 downwardly in direction "A" as shown in FIG. 5. This movement of plunger 34 causes opening 46 to engage gear face 50, thus preventing motor shaft 48 from rotating relative to housing 32. After motor shaft 48 mechanically engages opening 46, current may be disconnected from SMA devices 20, causing them to cool and move back to position "C" shown in FIG. 3. However, plunger 34 remains engaged with face gear 50 as a result of the engagement of inclined faces 47A of teeth 47 with inclined faces 51A of teeth 51. Motor shaft 48 is disengaged by any conventional means, such as by energizing motor 54 to a higher torque level than the initial setpoint.

The embodiment of FIGS. 3-5 may (but is not required to) include, without limitation, the following aspects:

The relatively small form and the ability to shape the shape memory wire, providing the ability to achieve smaller actuator and solenoid assemblies, and actuators and solenoids with envelopes conforming to particular needs of a system.

The SMA devices require a relatively low-energy input signal for actuation.

There is a predictable current and resistance change in SMA devices 20 when the shape memory material undergoes phase change from Martensite to Austenite. This change in current level may be monitored by a device or system (not shown) and used to verify actuation.

The present invention is useful as a component for engaging park brake mechanisms for electric calipers.

A first expression of the embodiment of FIGS. 3-5 is for a shape memory alloy actuator 30 which includes a housing 32, a plunger 34, a shaft 48, a resilient member 36, and a shape memory alloy component 20. The plunger 34 is slidably but non-rotatably received in the housing 32 and has a first locking component (such as, but not limited to, teeth 47). The shaft 48 has a second locking component (such as, but not limited to, teeth 51). The resilient member 36 is positioned to slidably urge the plunger 34 into a disengagement position (shown in FIG. 4) of the first and second locking components (such as teeth 47 and 51) allowing rotation of the shaft 48 (i.e., allowing relative rotation of the shaft 48 and the housing 32). The shape memory alloy component 20 is positioned to slidably urge the plunger 34 into an engagement position (shown in FIG. 5) of the first and second locking components (such as teeth 47 and 51), when the shape memory alloy component 20 is heated, preventing rotation of the shaft 48 (i.e., preventing relative rotation of the shaft 48 and the housing 32).

In one enablement of the first expression of the embodiment of FIGS. 3-5, the shape memory alloy actuator 30 also includes a power supply 25 adapted to deliver electrical current to, and thereby heat, the shape memory alloy component 20. In one example, the shape memory alloy actuator 30 also includes an electric motor 54 adapted to rotate the shaft 48. In one variation, the first and second locking components (such as teeth 47 and 51) are shaped to remain in the engagement position after the motor (54) has been rotated to a first predetermined torque level and turned off and after electric current delivery to the shape memory alloy component (20) has been stopped. In one modification, the first and second locking components (such as teeth 47 and 51) are shaped to return to the disengagement position from the engagement position with the electric current delivery to the shape memory alloy component (20) still stopped and after the motor (54) has been rotated to a second predetermined torque level which is greater than the first predetermined torque level. In one example, the first and second predetermined torque levels are determined by previous experiment or calculation, as is within the ordinary level of skill of the artisan.

A second expression of the embodiment of FIGS. 3-5 is for a shape memory alloy actuator 30 which includes a housing 32, a plunger 34, a shaft 48, a resilient member 36, and a shape memory alloy component 20. The plunger 34 is slidably but non-rotatably received in the housing 32 and has a central opening 46 with circumferentially spaced apart and radially-inwardly projecting teeth 47. The shaft 48 has circumferentially spaced apart and longitudinally projecting teeth 51. The resilient member 36 is positioned to slidably urge the plunger 34 into a disengagement position with the teeth 47 of the plunger 34 longitudinally spaced apart from the teeth 51 of the shaft 48 allowing rotation of the shaft 48. The shape memory alloy component 20 is positioned to slidably urge the plunger 34 into an engagement position with the teeth 47 of the plunger 34 longitudinally interdigitated with the teeth 51 of the shaft 48, when the shape memory alloy component 20 is heated, preventing rotation of the shaft 48.

The enablements, examples, etc. previously described for the first expression of the embodiment of FIGS. 3-5 are equally applicable to the second expression of the embodiment of FIGS. 3-5.

In one configuration of the second expression of the embodiment of FIGS. 3-5, the teeth 47 of the plunger 34 and the teeth 51 of the shaft 48 each have corresponding inclined faces 47A and 51A which remain in contact in the engagement position after the motor 54 has been rotated to a first predetermined torque level and turned off and after electric current delivery to the shape memory alloy component 20 has been stopped. In one variation the backs 51B of the teeth 51 of the shaft 48 rotate past an associated one of the backs 47B of the teeth 47 of the plunger 34 with the electric current delivery to the shape memory alloy component 20 still stopped and as the motor 54 is being rotated to a second predetermined torque level which is greater than the first predetermined torque level to return the shape memory alloy actuator 30 to the disengagement position from the engagement position.

In one construction of the second expression of the embodiment of FIGS. 3-5, the shape memory alloy component 20 has a clamshell shape and includes first and second legs 22 and 24, wherein the first leg 22 is disposed between the second leg 24 and a bottom surface 38 of the housing 32, and wherein the second leg 24 is disposed between the first leg 22 and an upper surface 52 of the plunger 34. In one variation, the shape memory alloy actuator 30 also includes a spring 56 positioned to bias the second leg 24 toward the first leg 22 after electric current delivery to the shape memory alloy component 20 has been stopped. In one modification, the spring 56 exerts a force equal to substantially 40% of the force exerted by the combined first and second legs 22 and 24 caused by the electric current delivery to the shape memory alloy component 20.

A third expression of the embodiment of FIGS. 3-5 is for a shape memory alloy actuator 30 which includes a vehicle-parking-brake latch housing 32, a plunger 34, a shaft 48, a resilient member 36, and a shape memory alloy component 20. The plunger 34 is slidably but non-rotatably received in the housing 32 and has a central opening 46 with circumferentially spaced apart and radially-inwardly projecting vehicle-parking-brake latch teeth 47. The shaft 48 has circumferentially spaced apart and longitudinally projecting vehicle-parking-brake latch teeth 51. The resilient member 36 is positioned to slidably urge the plunger 34 into a disengagement position with the teeth 47 of the plunger 34 longitudinally spaced apart from the teeth 51 of the shaft 48 allowing rotation of the shaft 48. The shape memory alloy component 20 is positioned to slidably urge the plunger 34 into an engagement position with the teeth 47 of the plunger 34 longitudinally interdigitated with the teeth 51 of the shaft 48, when the shape memory alloy component 20 is heated, preventing rotation of the shaft 48.

The enablements, examples, etc. previously described for the first expression of the embodiment of FIGS. 3-5 and the configurations, constructions, etc. previously described for the second expression of the embodiment of FIGS. 3-5 are equally applicable to the third expression of the embodiment of FIGS. 3-5.

In one application of the third expression of the embodiment of FIGS. 3-5, the electric motor 54 is the same electro-mechanical-brake (EMB) motor used to move the brake pad when the driver uses the foot brake to slow and stop the vehicle. In a different application, the electric motor 54 is a different motor from the EMB motor used to move the brake pad when the driver uses the foot brake to slow and stop the vehicle. Other vehicle and non-vehicle applications are left to the artisan.

The foregoing description of several expressions of an embodiment of the invention has been presented for purposes of illustration. It is not intended to be exhaustive or to limit the invention to the precise form disclosed, and obviously many modifications and variations are possible in light of the above teaching. For instance, actuators having SMA devices may be used in conjunction with electric caliper parking brake systems, motor brakes of all types, gear train brakes, relays, position controls, valves, latches, and locks. It is intended that the scope of the invention be defined by the claims appended hereto.

The invention claimed is:

1. A shape memory alloy actuator comprising:
a) a housing;
b) a plunger slidably but non-rotatably received in the housing and having a first locking component;
c) a shaft having a second locking component;
d) a resilient member positioned to slidably urge the plunger into a disengagement position of the first and second locking components allowing rotation of the shaft, wherein the plunger and the shaft are longitudinally spaced apart in the disengagement position; and
e) a shape memory alloy component positioned to slidably urge the plunger into an engagement position of the first and second locking components, when the shape memory alloy component is heated, preventing rotation of the shaft.

2. The shape memory alloy actuator of claim 1, also including a power supply adapted to deliver electrical current to, and thereby heat, the shape memory alloy component.

3. The shape memory alloy actuator of claim 2, also including an electric motor adapted to rotate the shaft.

4. The shape memory alloy actuator of claim 3, wherein the first and second locking components are shaped to remain in the engagement position after the motor has been rotated to a first predetermined torque level and turned off and after electric current delivery to the shape memory alloy component has been stopped.

5. The shape memory alloy actuator of claim 4, wherein the first and second locking components are shaped to return to the disengagement position from the engagement position with the electric current delivery to the shape memory alloy component still stopped and after the motor has been rotated to a second predetermined torque level which is greater than the first predetermined torque level.

6. A shape memory alloy actuator comprising:
a) a housing;
b) a plunger slidably but non-rotatably received in the housing and having a central opening with circumferentially spaced apart and radially-inwardly projecting teeth;
c) a shaft having circumferentially spaced apart and longitudinally projecting teeth;
d) a resilient member positioned to slidably urge the plunger into a disengagement position with the teeth of the plunger longitudinally spaced apart from the teeth of the shaft allowing rotation of the shaft; and
e) a shape memory alloy component positioned to slidably urge the plunger into an engagement position with the teeth of the plunger longitudinally interdigitated with the teeth of the shaft, when the shape memory alloy component is heated, preventing rotation of the shaft, wherein the shape memory alloy component has a clamshell shape and includes first and second legs, wherein the first leg is disposed between the second leg and a bottom surface of the housing, and wherein the second leg is disposed between the first leg and an upper surface of the plunger.

7. The shape memory alloy actuator of claim 6, also including a power supply adapted to deliver electrical current to, and thereby heat, the shape memory alloy component causing the first and second legs to move away from a closed position to a separated position and also including a spring positioned to bias the second leg toward the first leg after electric current delivery to the shape memory alloy component has been stopped.

8. The shape memory alloy actuator of claim 7, also including an electric motor adapted to rotate the shaft.

9. The shape memory alloy actuator of claim 8, wherein the teeth of the plunger and the teeth of the shaft are shaped to remain in the engagement position after the motor has been rotated to a first predetermined torque level and turned off and after electric current delivery to the shape memory alloy component has been stopped.

10. The shape memory alloy actuator of claim 9, wherein the teeth of the plunger and the teeth of the shaft are shaped to return to the disengagement position from the engagement position with the electric current delivery to the shape memory alloy component still stopped and after the motor has been rotated to a second predetermined torque level which is greater than the first predetermined torque level.

11. The shape memory alloy actuator of claim 10, wherein the teeth of the plunger and the teeth of the shaft each have corresponding inclined faces which remain in contact in the engagement position after the motor has been rotated to a first predetermined torque level and turned off and after electric current delivery to the shape memory alloy component has been stopped.

12. The shape memory alloy actuator of claim 11, wherein the backs of the teeth of the shaft rotate past an associated one of the backs of the teeth of the plunger with the electric current delivery to the shape memory alloy component still stopped and as the motor is being rotated to a second predetermined torque level which is greater than the first predetermined torque level to return the shape memory alloy actuator to the disengagement position from the engagement position.

13. The shape memory alloy actuator of claim 7, wherein the spring exerts a force equal to substantially 40% of the force exerted by the combined first and second legs caused by the electric current delivery to the shape memory alloy component.

14. A shape memory alloy actuator comprising:

a) a vehicle-parking-brake latch housing;

b) a plunger slidably but non-rotatably received in the housing and having a central opening with circumferentially spaced apart and radially-inwardly projecting vehicle-parking-brake latch teeth;

c) a shaft having circumferentially spaced apart and longitudinally projecting vehicle-parking-brake latch teeth;

d) a resilient member positioned to slidably urge the plunger into a disengagement position with the teeth of the plunger longitudinally spaced apart from the teeth of the shaft allowing rotation of the shaft; and e) a shape memory alloy component positioned to slidably urge the plunger into an engagement position with the teeth of the plunger longitudinally interdigitated with the teeth of the shaft, when the shape memory alloy component is heated, preventing rotation of the shaft, wherein the shape memory alloy component has a clamshell shape and includes first and second legs, wherein the first leg projects radially inward and is disposed between the second leg and a bottom surface of the housing, and wherein the second leg is disposed between the first leg and an upper surface of the plunger.

15. The shape memory alloy actuator of claim 14, also including a power supply adapted to deliver electrical current to, and thereby heat, the shape memory alloy component.

16. The shape memory alloy actuator of claim 15, also including an electric motor adapted to rotate the shaft.

17. The shape memory alloy actuator of claim 16, wherein the teeth of the plunger and the teeth of the shaft are shaped to remain in the engagement position after the motor has been rotated to a first predetermined torque level and turned off and after electric current delivery to the shape memory alloy component has been stopped.

18. The shape memory alloy actuator of claim 17, wherein the teeth of the plunger and the teeth of the shaft are shaped to return to the disengagement position from the engagement position with the electric current delivery to the shape memory alloy component still stopped and after the motor has been rotated to a second predetermined torque level which is greater than the first predetermined torque level.

* * * * *